United States Patent
Ohm et al.

(10) Patent No.: US 12,155,100 B2
(45) Date of Patent: Nov. 26, 2024

(54) FUEL CELL VEHICLE

(71) Applicants: HYUNDAI MOTOR COMPANY, Seoul (KR); KIA CORPORATION, Seoul (KR)

(72) Inventors: Ki Wook Ohm, Yongin-si (KR); Woo Young Lee, Yongin-si (KR); Jong Jun Lee, Yongin-si (KR); Myung Jin Kim, Suwon-si (KR); Sae Kwon Chang, Yongin-si (KR); Yoon Tae Kim, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 20 days.

(21) Appl. No.: 18/217,789

(22) Filed: Jul. 3, 2023

(65) Prior Publication Data
US 2024/0072283 A1 Feb. 29, 2024

(30) Foreign Application Priority Data
Aug. 31, 2022 (KR) .................. 10-2022-0110060

(51) Int. Cl.
*H01M 8/04858* (2016.01)
*B60L 50/75* (2019.01)
*H01M 16/00* (2006.01)

(52) U.S. Cl.
CPC ......... *H01M 8/04888* (2013.01); *B60L 50/75* (2019.02); *H01M 8/0494* (2013.01); *H01M 8/04947* (2013.01); *H01M 16/003* (2013.01); *H01M 16/006* (2013.01); *B60L 2210/10* (2013.01); *H01M 2220/20* (2013.01); *H01M 2250/20* (2013.01)

(58) Field of Classification Search
CPC ........................... B60L 50/75; B60L 2210/10
USPC .................................................. 307/9.1, 10.1
See application file for complete search history.

(56) References Cited

U.S. PATENT DOCUMENTS

2024/0174133 A1* 5/2024 Jeong ..................... B60L 58/12

FOREIGN PATENT DOCUMENTS

JP         6477512 A         3/2019

* cited by examiner

*Primary Examiner* — Hal Kaplan
(74) *Attorney, Agent, or Firm* — Morgan, Lewis & Bockius LLP

(57) ABSTRACT

A fuel cell vehicle includes a cell stack, a DC level converter, an output unit, a first switching unit disposed between a positive output terminal of the DC level converter and a positive input terminal of the output unit, a second switching unit disposed between a negative output terminal of the DC level converter and a negative input terminal of the output unit, a resistor and a third switching unit connected to each other in series between the positive output terminal of the DC level converter and the negative output terminal of the DC level converter, a fourth switching unit disposed between a contact point between the resistor and the third switching unit and the positive input terminal of the output unit, and a controller for controlling switching operation of the first, second, third and fourth switching units according to an operation mode.

20 Claims, 6 Drawing Sheets

FUEL CELL VEHICLE

CROSS-REFERENCE TO RELATED APPLICATION

The present application claims priority to Korean Patent Application No. 10-2022-0110060, filed on Aug. 31, 2022, the entire contents of which is incorporated herein for all purposes by this reference.

BACKGROUND OF THE PRESENT DISCLOSURE

Field of the Present Disclosure

The present disclosure relates to a fuel cell vehicle.

Description of Related Art

In a vehicle provided with a fuel cell including a cell stack, a boost converter boosts voltage generated in the fuel cell, and a load of the fuel cell vehicle, such as a motor, is driven using the boosted voltage. In the instant case, a discharge resistor is necessary to discharge voltage generated in the fuel cell or voltage charged in the boost converter when operation of the fuel cell system is stopped, and a precharge resistor is necessary to perform precharge operation before main power is supplied to a load when operation of the fuel cell system is started.

Because the discharge resistor and the precharge resistor are provided separately from each other, the cost of manufacturing the fuel cell vehicle may be increased, and the weight thereof may be increased. Therefore, research with the goal of solving the present problem is underway.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fuel cell vehicle that substantially obviates one or more problems due to limitations and disadvantages of the related art.

Embodiments provide a fuel cell vehicle configured for performing a discharge mode and a precharge mode using a single resistor.

However, the objects to be accomplished by the exemplary embodiments are not limited to the above-mentioned objects, and other objects not mentioned herein will be clearly understood by those skilled in the art from the following description.

A fuel cell vehicle according to various exemplary embodiments of the present disclosure may include a cell stack including a plurality of unit cells stacked one above another, a DC level converter connected to the cell stack and configured to convert the level of stack voltage output from the cell stack and to output voltage including the converted level, an output unit configured to be driven in response to at least one of main power or auxiliary power and to store auxiliary power, a first switching unit disposed between a positive output terminal of the DC level converter and a positive input terminal of the output unit to be connected thereto, a second switching unit disposed between a negative output terminal of the DC level converter and a negative input terminal of the output unit to be connected thereto, a resistor and a third switching unit connected to each other in series between the positive output terminal of the DC level converter and the negative output terminal of the DC level converter, a fourth switching unit disposed between a contact point between the resistor and the third switching unit and the positive input terminal of the output unit to be connected thereto, and a controller configured to control switching operation of the first, second, third and fourth switching units according to an operation mode.

In an exemplary embodiment of the present disclosure, the operation mode may include a plurality of modes operating at different time points.

In an exemplary embodiment of the present disclosure, the plurality of modes may include a discharge mode for discharging energy remaining in each of the cell stack and the DC level converter and a precharge mode for operating before the main power is supplied to the output unit.

In an exemplary embodiment of the present disclosure, the resistor may include a variable resistor.

In an exemplary embodiment of the present disclosure, the resistance value of the variable resistor may be determined according to at least one of the performance time of the operation mode or the heat generation temperature of the resistor.

In an exemplary embodiment of the present disclosure, the resistor may have a resistance value of 100Ω to 200Ω.

In an exemplary embodiment of the present disclosure, the DC level converter may include an input capacitor disposed between an output terminal of a positive-electrode side of the cell stack and an output terminal of a negative-electrode side of the cell stack, an output capacitor disposed between the positive output terminal of the DC level converter and the negative output terminal of the DC level converter, an inductor including one end connected to the output terminal of the positive-electrode side of the cell stack, a diode including an anode connected to the other end of the inductor and a cathode connected to the positive output terminal of the DC level converter, and a semiconductor switch disposed between the anode of the diode and the output terminal of the negative-electrode side of the cell stack to be connected thereto and configured to be switched in response to a driving control signal.

In an exemplary embodiment of the present disclosure, the resistor may have one end connected to the cathode of the diode, and the third switching unit may be disposed between the other end of the resistor and the negative output terminal of the DC level converter to be connected thereto.

In an exemplary embodiment of the present disclosure, the resistor may be disposed in the DC level converter.

In an exemplary embodiment of the present disclosure, the DC level converter may include a first cooling unit configured to cool the resistor in a water-cooling manner.

In an exemplary embodiment of the present disclosure, the fuel cell vehicle may further include a junction box disposed between the DC level converter and the output unit to distribute power generated in the cell stack, and the first, second, third and fourth switching units may be disposed in the junction box.

In an exemplary embodiment of the present disclosure, the junction box may include a second cooling unit configured to cool the first, second, third and fourth switching units in an air-cooling manner.

In an exemplary embodiment of the present disclosure, the resistor may be disposed in the junction box.

In an exemplary embodiment of the present disclosure, the resistor may be detachably disposed in the junction box.

In an exemplary embodiment of the present disclosure, the output unit may include a load terminal configured to be driven in response to at least one of the main power or the auxiliary power supplied through the positive input terminal and the negative input terminal and a power storage unit configured to supply the stored auxiliary power to the load terminal through the positive input terminal and the negative input terminal.

In an exemplary embodiment of the present disclosure, the power storage unit may include a high-voltage battery configured to supply the stored auxiliary power to the load terminal through the positive input terminal and the negative input terminal.

In an exemplary embodiment of the present disclosure, the power storage unit may include a supercapacitor configured to supply the stored auxiliary power to the load terminal through the positive input terminal and the negative input terminal.

A fuel cell vehicle according to another exemplary embodiment of the present disclosure may include a cell stack including a plurality of unit cells stacked one above another, an input capacitor disposed between an output terminal of a positive-electrode side of the cell stack and an output terminal of a negative-electrode side of the cell stack, an inductor including one end connected to the output terminal of the positive-electrode side of the cell stack, a diode including an anode connected to the other end of the inductor, an output capacitor disposed between a cathode of the diode and the output terminal of the negative-electrode side of the cell stack to be connected thereto, a semiconductor switch disposed between the anode of the diode and the output terminal of the negative-electrode side of the cell stack to be connected thereto and configured to be switched in response to a driving control signal, a power storage unit configured to store auxiliary power, a load terminal configured to be driven in response to at least one of main power applied across first and second ends of the output capacitor or the auxiliary power stored in the power storage unit, a first switching unit disposed between a positive input terminal of each of the load terminal and the power storage unit and the cathode of the diode to be connected thereto, a second switching unit disposed between a negative input terminal of each of the load terminal and the power storage unit and the output terminal of the negative-electrode side of the cell stack to be connected thereto, a resistor including one end connected to the cathode of the diode, a third switching unit disposed between the other end of the resistor and the output terminal of the negative-electrode side of the cell stack to be connected thereto, a fourth switching unit disposed between the positive input terminal of each of the load terminal and the power storage unit and the other end of the resistor to be connected thereto, and a controller configured to control switching operation of the first, second, third and fourth switching units according to an operation mode.

In an exemplary embodiment of the present disclosure, the fuel cell vehicle may further include a DC level converter connected to the cell stack and configured to convert the level of stack voltage output from the cell stack and to output voltage including the converted level and a junction box disposed between the DC level converter and each of the load terminal and the power storage unit. The DC level converter may include the input capacitor, the output capacitor, the semiconductor switch, the diode, the inductor, and the resistor, and the junction box may include the first, second, third and fourth switching units.

In an exemplary embodiment of the present disclosure, the fuel cell vehicle may further include a DC level converter connected to the cell stack and configured to convert the level of stack voltage output from the cell stack and to output voltage including the converted level and a junction box disposed between the DC level converter and each of the load terminal and the power storage unit. The DC level converter may include the input capacitor, the output capacitor, the semiconductor switch, the diode, and the inductor, and the junction box may include the first, second, third and fourth switching units and the resistor.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
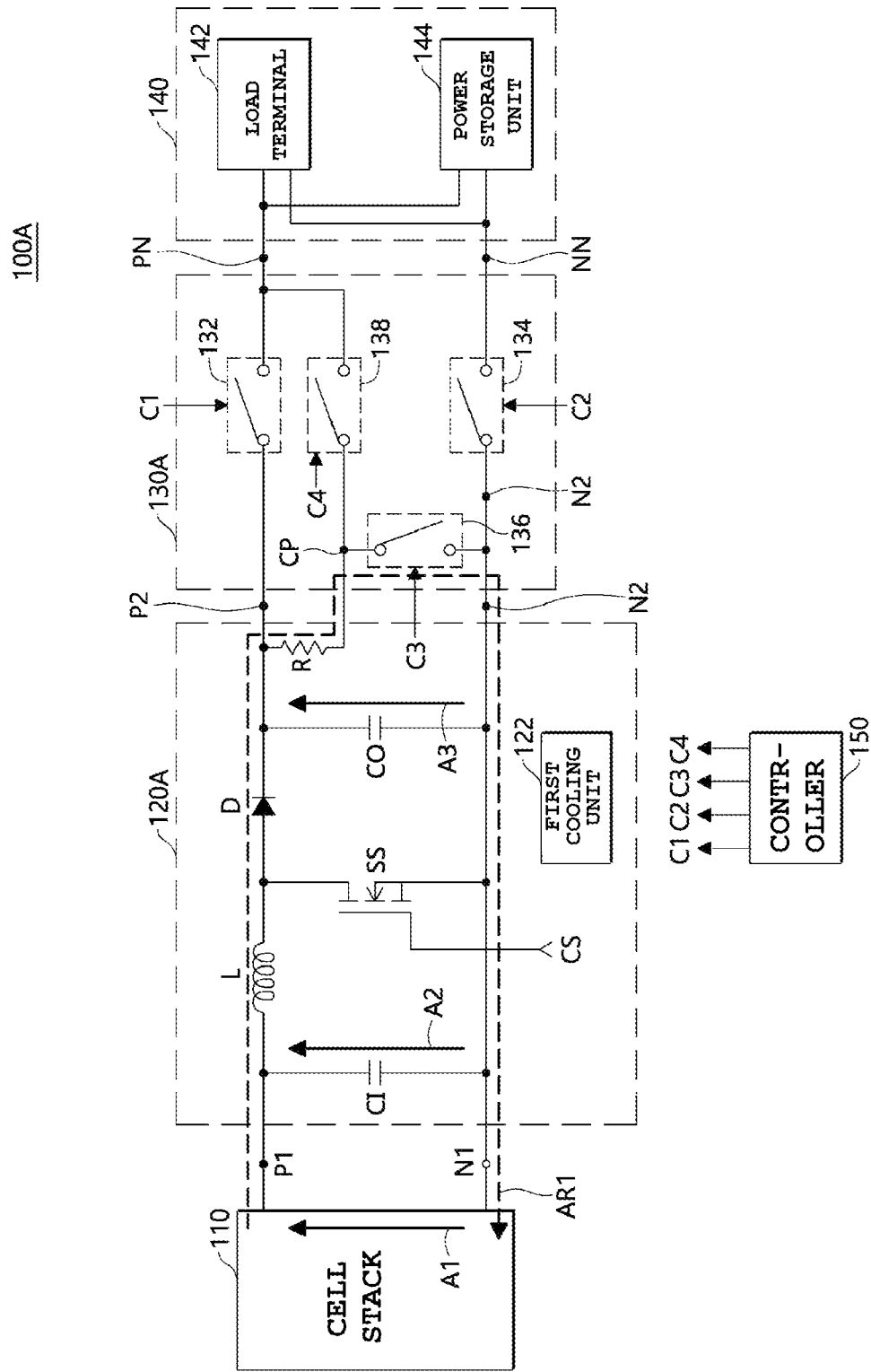
FIG. 1 is a block diagram of a fuel cell vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The present disclosure will now be described more fully hereinafter with reference to the accompanying drawings, in which various exemplary embodiments of the present disclosure are shown. The examples, however, may be embodied in various forms, and may not be construed as being limited to the exemplary embodiments set forth herein.

Rather, these embodiments are provided so that the present disclosure will be more thorough and complete, and will more fully convey the scope of the present disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

Furthermore, relational terms, such as "first", "second", "on/upper part/above", and "under/lower part/below", are used only to distinguish between one subject or element and another subject or element, without necessarily requiring or involving any physical or logical relationship or sequence between the subjects or elements.

Hereinafter, fuel cell vehicles 100A, 100B, and 100C according to various exemplary embodiments will be described with reference to the accompanying drawings.

Figure 2:
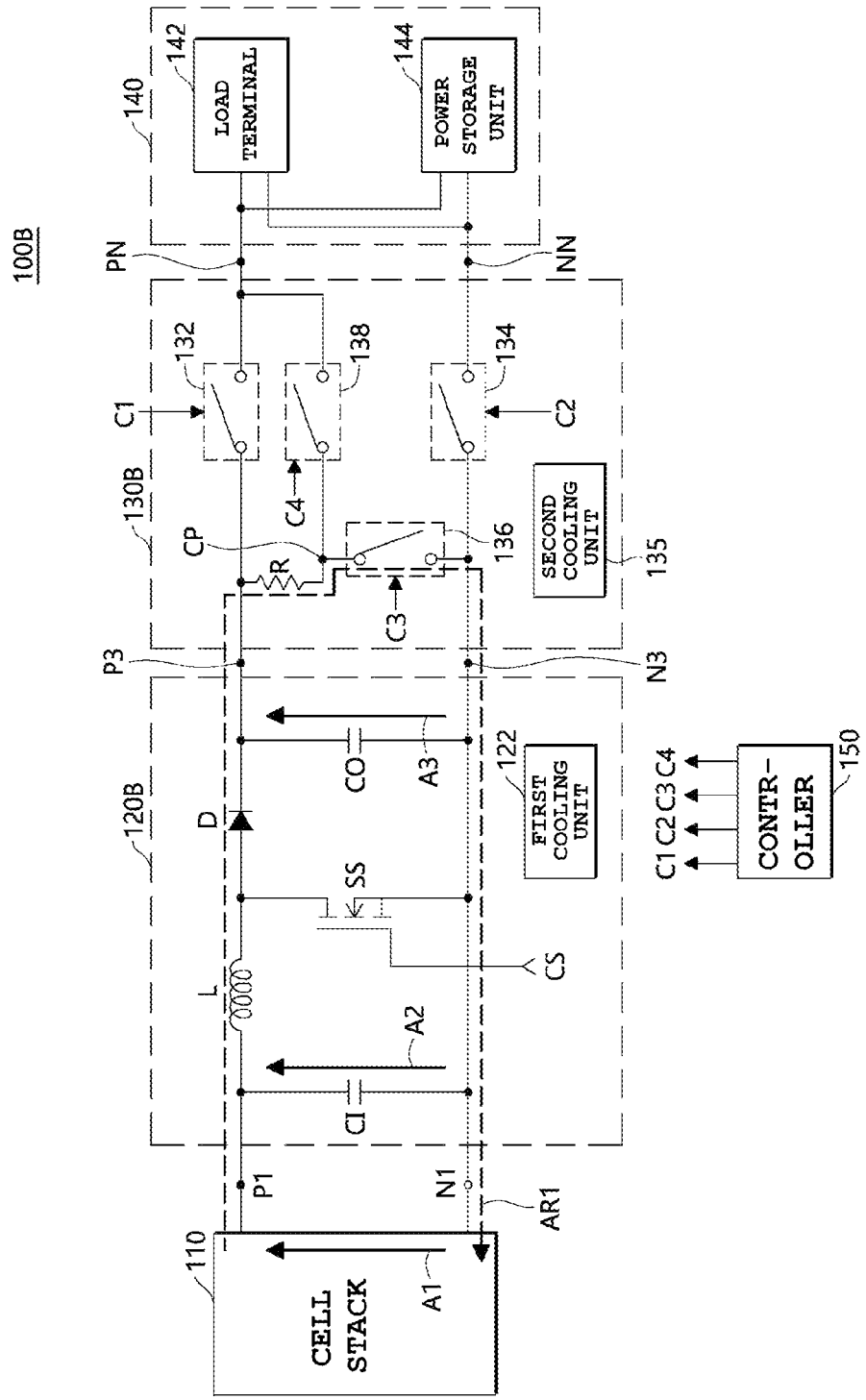
FIG. 2 is a block diagram of a fuel cell vehicle according to another exemplary embodiment of the present disclosure.

FIG. 1 is a block diagram of a fuel cell vehicle 100A according to an exemplary embodiment of the present disclosure, and FIG. 2 is a block diagram of a fuel cell vehicle 100B according to another exemplary embodiment of the present disclosure.

Each of the fuel cell vehicles 100A and 100B shown in FIG. 1 and FIG. 2 may include a cell stack 110, a DC level converter 120A or 120B, a junction box (or a high-voltage junction box or a power distribution unit (PDU)) 130A or 130B, an output unit 140, and a controller 150.

An example of a fuel cell which may be included in the fuel cell vehicles 100A and 100B will be described below in brief. However, the exemplary embodiments are not limited to any specific form of fuel cell included in the fuel cell vehicles 100A and 100B.

The fuel cell may be a polymer electrolyte membrane fuel cell (or a proton exchange membrane fuel cell) (PEMFC), which has been studied most extensively as a power source for driving vehicles. The fuel cell may include a cell stack 110.

The cell stack 110 may include a plurality of unit cells stacked one above another. The number of unit cells may be determined based on the intensity of the power which is to be generated in the fuel cell.

The DC level converter 120A or 120B converts the level of stack voltage output from the cell stack 110 and outputs the converted stack voltage.

The DC level converter 120A or 120B may divert voltage output from the cell stack 110 (hereinafter referred to as "stack voltage"), or may convert the level of the stack voltage and may output voltage including the converted level. The stack voltage corresponds to a potential difference between an output terminal P1 of a positive-electrode side of the cell stack 110 and an output terminal N1 of a negative-electrode side of the cell stack 110.

The DC level converter 120A or 120B may be implemented as a boost converter. The boost converter may be a DC/DC converter that converts the DC level of the stack voltage and outputs voltage including the converted level. The boost converter 120 may increase the level of the stack voltage to a level required by the output unit 140.

The junction box 130A or 130B is disposed between the DC level converter 120A or 120B and the output unit 140, and is configured to distribute power generated in the cell stack 110 of the fuel cell. For example, the junction box 130A or 130B may include fuses and relays to control components of peripheral auxiliary devices (balance-of-plant (BOP)) assisting in the operation of the fuel cell. Here, an example of the fuses is shown in FIG. 5, and the relays may correspond to switching units 132 to 138 shown in FIG. 1, FIG. 2, FIG. 3, and FIG. 4 or relay elements 172 to 182 shown in FIG. 5.

Hereinafter, the configuration of the DC level converter 120A and the junction box 130A of the fuel cell vehicle 100A shown in FIG. 1 will be described.

The DC level converter 120A may include an input capacitor CI, an inductor L, a diode D, an output capacitor CO, a semiconductor switch SS, and a resistor R.

The input capacitor CI may be disposed between the output terminal P1 of the positive-electrode side of the cell stack 110 and the output terminal N1 of the negative-electrode side of the cell stack 110.

The output capacitor CO may be disposed between a positive output terminal P2 of the DC level converter 120A and a negative output terminal N2 of the DC level converter 120A. That is, the output capacitor CO may be disposed between a cathode of the diode D and the output terminal N1 of the negative-electrode side of the cell stack 110 to be connected thereto. For example, the input and output capacitors CI and CO may be smoothing capacitors.

The inductor L has one end connected to the output terminal P1 of the positive-electrode side of the cell stack 110.

The diode D has an anode connected to the other end of the inductor L and a cathode connected to the positive output terminal P2 of the DC level converter 120A.

The semiconductor switch SS may be disposed between the anode of the diode D and the output terminal N1 of the negative-electrode side of the cell stack 110 to be connected thereto, and may be switched in response to a driving control signal CS.

The semiconductor switch SS may be implemented as an insulated gate bipolar transistor (IGBT) or a field effect transistor (FET). For example, as illustrated in the drawings, the semiconductor switch SS may be implemented as a transistor. The transistor may include a gate G connected to the driving control signal CS, a drain D connected to the anode of the diode D, and a source S connected to the output terminal N1 of the negative-electrode side of the cell stack 110.

The resistor R has one end connected to the cathode of the diode D and another end connected to the junction box 130A.

The junction box 130A may include first to fourth switching units 132, 134, 136, and 138. Each of the first, second, third and fourth switching units 132, 134, 136, and 138 may be implemented as a switching element or a relay element.

The first switching unit 132 may be disposed between the positive output terminal P2 of the DC level converter 120A and a positive input terminal PN of the output unit 140 to be connected thereto, and may be switched on (or turned on) or switched off (or turned off) in response to a first control signal C1.

The second switching unit 134 may be disposed between the negative output terminal N2 of the DC level converter 120A and a negative input terminal NN of the output unit 140 to be connected thereto, and may be switched on (or turned on) or switched off (or turned off) in response to a second control signal C2.

The third switching unit 136 and the resistor R may be connected to each other in series between the positive output terminal P2 of the DC level converter 120A and the negative output terminal N2 of the DC level converter 120A. As described above, the resistor R may be included in the DC level converter 120A, and the third switching unit 136 may be included in the junction box 130A. That is, the resistor R may have one end connected to the cathode of the diode D, and the third switching unit 136 may be disposed between the other end of the resistor R and the output terminal N1 of the negative-electrode side of the cell stack 110 (i.e., the negative output terminal N2 of the DC level converter 120A) to be connected thereto, and may be switched on (or turned on) or switched off (or turned off) in response to a third control signal C3.

The fourth switching unit 138 may be disposed between a contact point CP between the resistor R and the third switching unit 136 and the positive input terminal PN of the output unit 140 to be connected thereto, and may be switched on (or turned on) or switched off (or turned off) in response to a fourth control signal C4.

Hereinafter, the configuration of the DC level converter 120B and the junction box 130B of the fuel cell vehicle 100B shown in FIG. 2 will be described.

In the case of the fuel cell vehicle 100A shown in FIG. 1, the resistor R is included in the DC level converter 120A, and the junction box 130A includes the switching units 132 to 138. However, in the case of the fuel cell vehicle 100B shown in FIG. 2, the resistor R is included in the junction box 130B. With the present exception, the fuel cell vehicle 100B shown in FIG. 2 has the same configuration as the fuel cell vehicle 100A shown in FIG. 1.

The DC level converter 120B may include an input capacitor CI, an inductor L, a diode D, an output capacitor CO, and a semiconductor switch SS.

The input capacitor CI may be disposed between the output terminal P1 of the positive-electrode side of the cell stack 110 and the output terminal N1 of the negative-electrode side of the cell stack 110.

The output capacitor CO may be disposed between a positive output terminal P3 of the DC level converter 120B and a negative output terminal N3 of the DC level converter 120B. That is, the output capacitor CO may be disposed between the cathode of the diode D and the output terminal N1 of the negative-electrode side of the cell stack 110 to be connected thereto.

The inductor L has one end connected to the output terminal P1 of the positive-electrode side of the cell stack 110.

The diode D has a anode connected to the other end of the inductor L and a cathode connected to the positive output terminal P3 of the DC level converter 120B.

The semiconductor switch SS may be disposed between the anode of the diode D and the output terminal N1 of the negative-electrode side of the cell stack 110 to be connected thereto, and may be switched in response to a driving control signal CS.

The junction box 130B may include first to fourth switching units 132, 134, 136, and 138 and a resistor R.

The first switching unit 132 may be disposed between the positive output terminal P3 of the DC level converter 120B and the positive input terminal PN of the output unit 140 to be connected thereto, and may be switched on (or turned on) or switched off (or turned off) in response to a first control signal C1.

The second switching unit 134 may be disposed between the negative output terminal N3 of the DC level converter 120B and the negative input terminal NN of the output unit 140 to be connected thereto, and may be switched on (or turned on) or switched off (or turned off) in response to a second control signal C2.

The third switching unit 136 and the resistor R may be connected to each other in series between the positive output terminal P3 of the DC level converter 120B and the negative output terminal N3 of the DC level converter 120B. As described above, both the resistor R and the third switching unit 136 may be included in the junction box 130B. That is, the resistor R may have one end connected to the cathode of the diode D, and the third switching unit 136 may be disposed between the other end of the resistor R and the output terminal N1 of the negative-electrode side of the cell stack 110 (i.e., the negative output terminal N3 of the DC level converter 120B) to be connected thereto, and may be switched on (or turned on) or switched off (or turned off) in response to a third control signal C3.

The fourth switching unit 138 may be disposed between a contact point CP between the resistor R and the third switching unit 136 and the positive input terminal PN of the output unit 140 to be connected thereto, and may be switched on (or turned on) or switched off (or turned off) in response to a fourth control signal C4.

Furthermore, the DC level converter 120A or 120B may further include a first cooling unit 122.

The first cooling unit 122 is configured to cool the inductor L and the semiconductor switch SS, which are heat generation elements among the components of the DC level converter 120A or 120B. For example, the first cooling unit 122 may be of a water-cooling type. As shown in FIG. 1, the first cooling unit 122 may cool the resistor R in a water-cooling manner.

Furthermore, the junction box 130A or 130B may further include a second cooling unit 135, or may include no cooling unit.

According to an exemplary embodiment of the present disclosure, as shown in FIG. 1, the second cooling unit 135 may be omitted from the junction box 130A. That is, as shown in FIG. 1, when the resistor R is included in the DC level converter 120A, the junction box 130A includes only the first, second, third and fourth switching units 132 to 138, and thus the second cooling unit 135 may not be included in the junction box 130A.

According to another exemplary embodiment of the present disclosure, the junction box 130A may further include the second cooling unit 135. In the instant case, because the junction box 130A includes only the first, second, third and fourth switching units 132 to 138, the second cooling unit 135 may cool the first, second, third and fourth switching units 132 to 138 in an air-cooling manner, rather than a water-cooling manner.

However, as shown in FIG. 2, when the resistor R is included in the junction box 130A, the second cooling unit 135 may not be omitted from the junction box 130A, and may cool the resistor R. In the instant case, the second cooling unit 135 may cool the resistor R and the first, second, third and fourth switching units 132 to 138 in a water-cooling manner.

Meanwhile, the output unit 140 may be driven in response to at least one of main power or auxiliary power, and may store auxiliary power.

As shown in FIG. 1 and FIG. 2, the output unit 140 may include a load terminal 142 and a power storage unit 144.

The load terminal 142 is driven in response to at least one of the main power or the auxiliary power supplied through the positive input terminal PN and the negative input terminal NN of the output unit 140. That is, the load terminal 142 may be driven in response to at least one of the main power applied across both ends of the output capacitor CO or the auxiliary power stored in the power storage unit 144.

In an exemplary embodiment of the present disclosure, the load terminal 142 may be connected to the DC level converter 120A or 120B to receive the main power, and may be connected to the power storage unit 144 to receive the auxiliary power. For example, the load terminal 142 may include an inverter and a motor.

The inverter is connected to the positive output terminal P2 or P3 and the negative output terminal N2 or N3 of the DC level converter 120A or 120B, converts the received DC-type voltage or the DC-type voltage stored in the power storage unit 144 into AC-type voltage depending on the travel state of the fuel cell vehicle 100A or 100B, and outputs the AC-type voltage to the motor.

The motor may be driven in response to the AC-type voltage output from the inverter. That is, the motor may rotate upon receiving the AC voltage for the motor from the inverter, and thus is configured to drive the fuel cell vehicle 100A or 100B. For example, the motor may be a three-phase AC rotating device including a rotor in which a permanent magnet is embedded, but the exemplary embodiments are not limited to any specific form of the motor.

Furthermore, although not shown, the load terminal 142 of the fuel cell vehicle 100A or 100B may include parts necessary for driving the vehicle, such as a motor-driven power steering (MDPS) device, a radiator fan, and headlights. These various parts included in the load terminal 142 may be driven upon receiving voltage output from the DC level converter 120A or 120B or voltage corresponding to the auxiliary power stored in the power storage unit 144 as driving voltage.

The power storage unit 144 may store auxiliary power, and may supply the stored auxiliary power to the load terminal 142 through the positive input terminal PN and the negative input terminal NN of the output unit 140. For example, the power storage unit 144 may be implemented as a high-voltage battery or a supercapacitor.

The high-voltage battery or the supercapacitor, which functions as the power storage unit 144, may supply the auxiliary power stored therein to the load terminal 142 through the positive input terminal PN and the negative input terminal NN of the output unit 140.

In the instant case, the junction box 130A or 130B may be disposed between the DC level converter 120A or 120B and each of the load terminal 142 and the power storage unit 144. The connection relationship between each of the first, second, and fourth switching units 132, 134, and 138 included in the junction box 130A or 130B, the load terminal 142, and the power storage unit 144 will be described below.

The first switching unit 132 may be disposed between the positive input terminal PN of each of the load terminal 142 and the power storage unit 144 and the cathode of the diode D to be connected thereto.

The second switching unit 134 may be disposed between the negative input terminal NN of each of the load terminal 142 and the power storage unit 144 and the output terminal N1 of the negative-electrode side of the cell stack 110 (i.e., the negative output terminal N2 or N3 of the DC level converter 120A or 120B) to be connected thereto.

The fourth switching unit 138 may be disposed between the positive input terminal PN of each of the load terminal 142 and the power storage unit 144 and the other end of the resistor R to be connected thereto.

Meanwhile, the controller 150 may control switching operation of the first, second, third and fourth switching units 132 to 138 according to an operation mode. Furthermore, the controller 150 may generate a driving control signal CS for controlling operation of the semiconductor switch SS and may output the driving control signal CS to the DC level converter 120A or 120B. The first, second, third and fourth switching units 132 to 138 included in the junction box 130A or 130B may be switched ON/OFF under the control of the controller 150, and thus paths through which current flows may be variously formed.

According to the exemplary embodiment of the present disclosure, the operation mode may include a plurality of modes that operate at different time points. The plurality of operation modes may include a discharge mode and a precharge mode.

The discharge mode is a mode in which energy remaining in the cell stack 110 is discharged. When the discharge mode is performed, electrical energy remaining in the cell stack 110 is discharged and consumed, and thus voltage remaining in the cell stack 110 is reduced to a predetermined level or less. For example, in the case of the fuel cell vehicle 100A or 100B according to the exemplary embodiment of the present disclosure, electrical energy remaining in the cell stack 110 may be reduced to less than 60 V (DC) and 30 V (AC) within 60 seconds after stop of travel of the fuel cell vehicle 100A or 100B.

Furthermore, in the discharge mode, energy remaining in the DC level converter 120A or 120B as well as energy remaining in the cell stack 110 may be discharged and consumed. Here, the energy remaining in the DC level converter 120A or 120B may be energy charged in the input capacitor CI and the output capacitor CO.

The precharge mode is a mode which is performed before main power is supplied to the load terminal 142 of the output unit 140. When the first switching unit 132 is switched on (or turned on), overcurrent may be generated due to a difference between the level of voltage output from the DC level converter 120A or 120B and the level of voltage corresponding to the auxiliary power stored in the power storage unit 144, and thus an element, such as the first switching unit 132, may be thermally damaged. To prevent the present problem, the precharge mode is performed to make the level of voltage output from the DC level converter 120A or 120B and the level of voltage corresponding to the auxiliary power stored in the power storage unit 144 equal to each other before the first switching unit 132 is switched on (or turned on).

The discharge mode and the precharge mode described above are not performed at the same time. That is, in the fuel cell vehicle 100A or 100B, the discharge mode is performed when the fuel cell system is turned off (or stopped), and the precharge mode is performed when the fuel cell system is turned on (or operated).

Hereinafter, operation of each of the fuel cell vehicles 100A and 100B configured as described above will be described with reference to the accompanying drawings.

First, the discharge mode performed in each of the fuel cell vehicles 100A and 100B will be described below with reference to FIG. 1 and FIG. 2.

The controller 150 generates first to fourth control signals C1 to C4 in the discharge mode, as shown in Table 1 below.

The following description will be provided on the assumption that the switching units 132 to 138 are switched off (or turned off) when the control signals C1 to C4 are OFF, and are switched on (or turned on) when the control signals are ON.

TABLE 1

| C1 | C2 | C3 | C4 |
|----|-----|-----|-----|
| ON | OFF | OFF | OFF |

In the discharge mode, only the third switching unit 136 is switched on (or turned on), and thus a path through which current flows is formed, as indicated by the arrow AR1 in FIG. 1 and FIG. 2. Accordingly, the energy remaining in the cell stack 110 may be discharged in the direction indicated by the arrow A1, the energy remaining in the input capacitor CI may be discharged in the direction indicated by the arrow A2, and the energy remaining in the output capacitor CO may be discharged in the direction indicated by the arrow A3. In the instant case, the energy remaining in the cell stack 110, the energy remaining in the input capacitor CI, and the energy remaining in the output capacitor CO may be discharged and consumed at the same time.

Next, the precharge mode performed in each of the fuel cell vehicles 100A and 100B will be described below with reference to FIG. 3 and FIG. 4.

Figure 3:
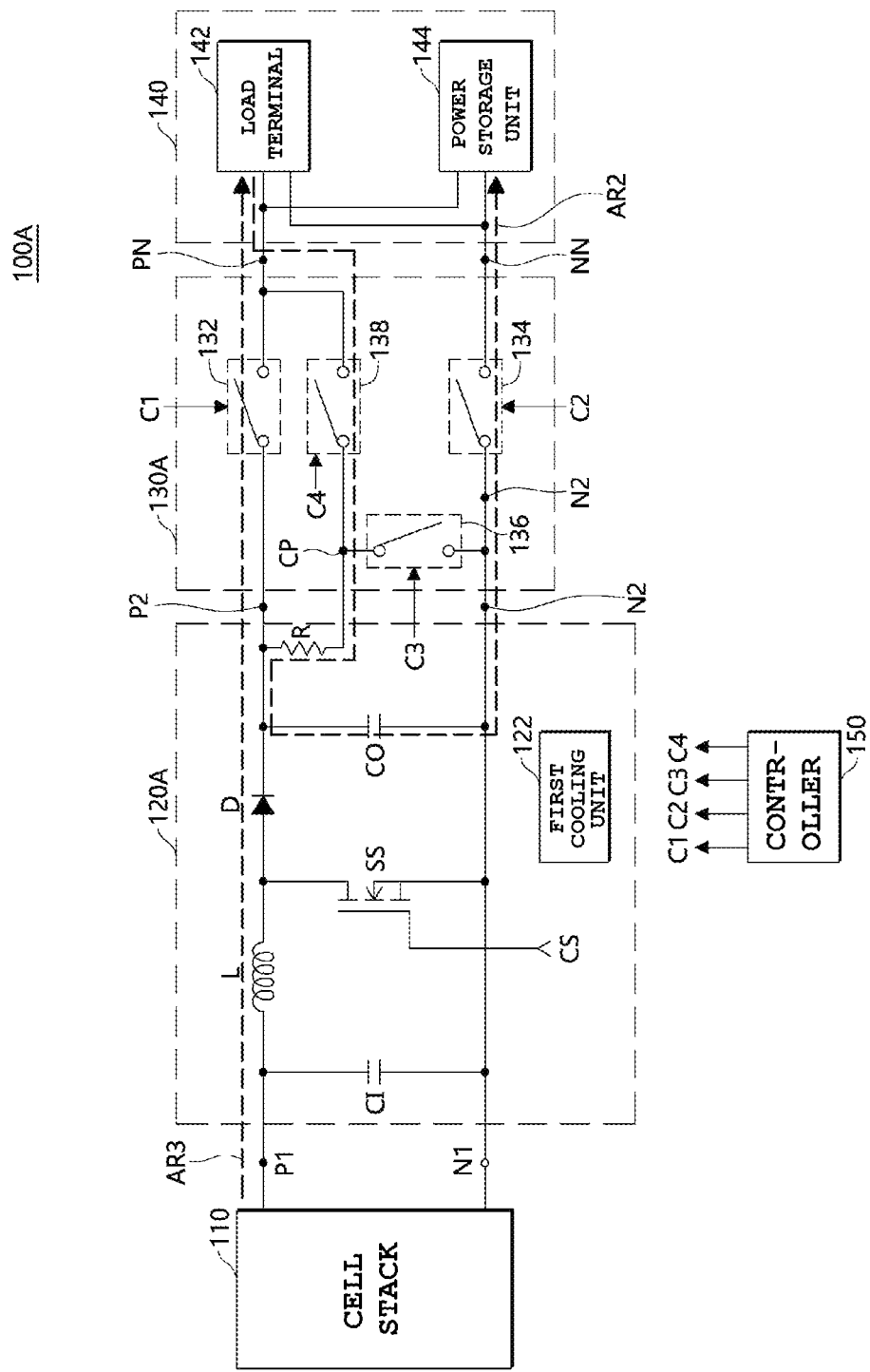
FIG. 3 is a block diagram for explaining a precharge mode of the fuel cell vehicle shown in FIG. 1.
Figure 4:
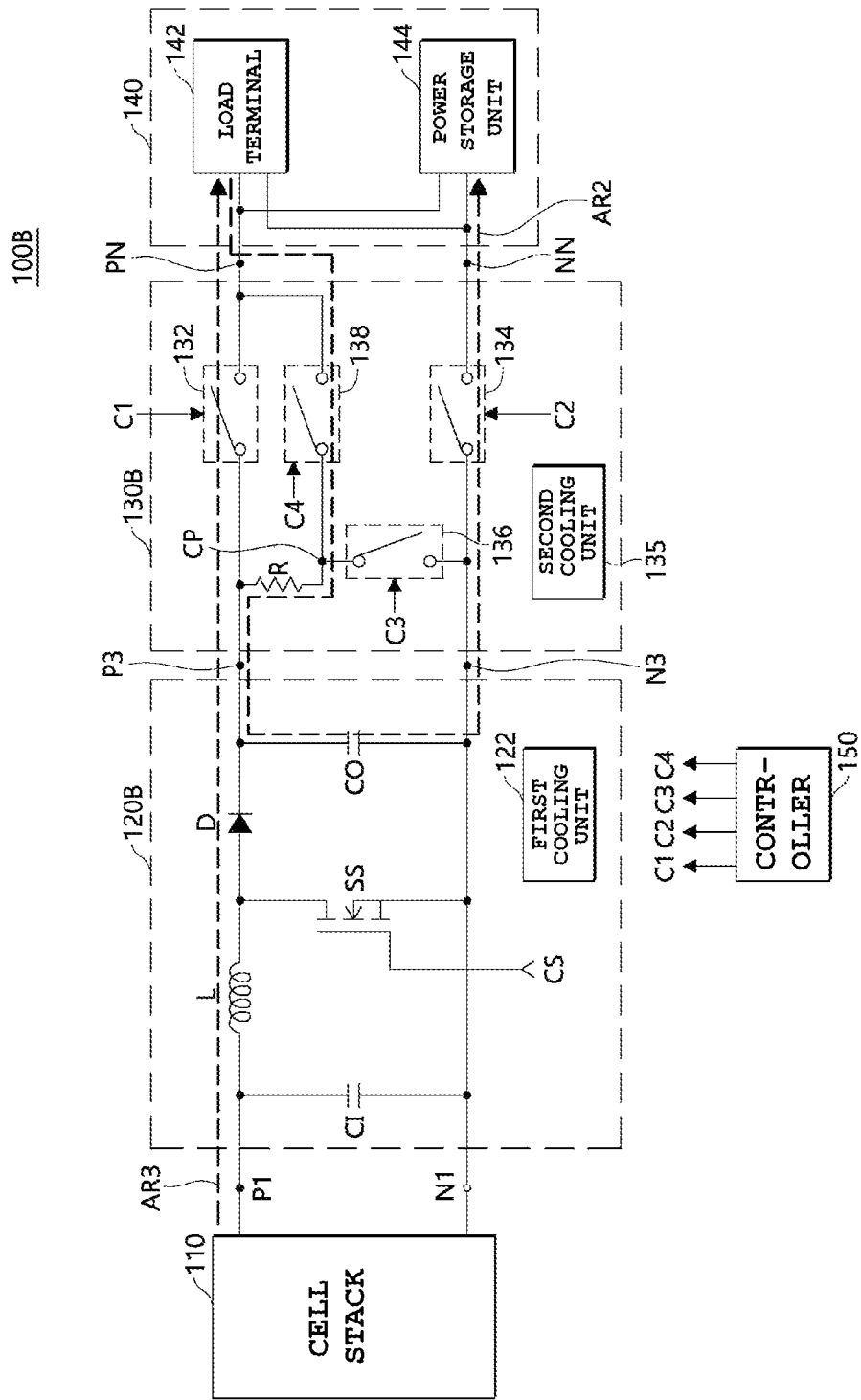
FIG. 4 is a block diagram for explaining a precharge mode of the fuel cell vehicle shown in FIG. 2.
Figure 5:
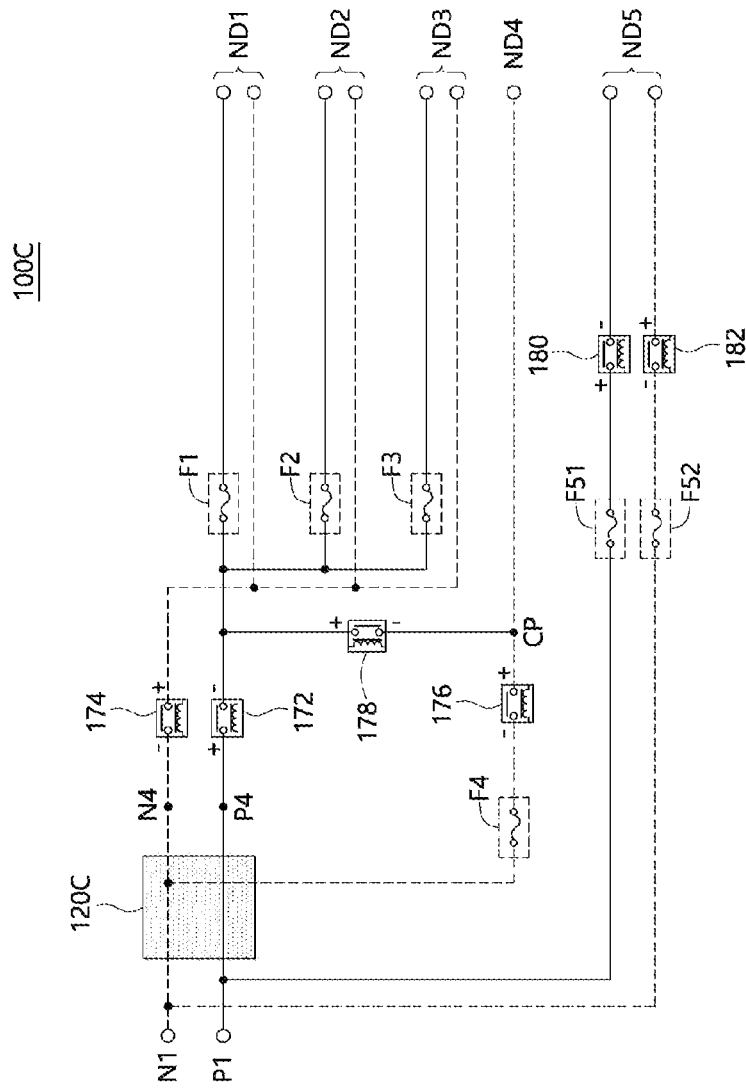
FIG. 5 is a circuit diagram of a fuel cell vehicle according to yet another exemplary embodiment of the present disclosure.

FIG. 3 and FIG. 4 are block diagrams for explaining the precharge mode of the fuel cell vehicles 100A and 100B shown in FIG. 1 and FIG. 2.

The fuel cell vehicles 100A and 100B shown in FIG. 3 and FIG. 4 respectively have the same configuration as the fuel cell vehicles 100A and 100B shown in FIG. 1 and FIG. 2. FIG. 3 and FIG. 4 are drawings accompanied herewith to explain operation in the precharge mode.

The controller 150 may generate first to fourth control signals C1 to C4 in the precharge mode, as shown in Table 2 below.

TABLE 2

| Operation Stage | C1 | C2 | C3 | C4 |
|---|---|---|---|---|
| 1st Stage | OFF | ON | OFF | ON |
| 2nd Stage | ON | ON | OFF | ON |
| 3rd Stage | ON | ON | OFF | OFF |

In the first stage of the precharge mode, as shown in Table 2, the second switching unit 134 and the fourth switching unit 138 are switched on (or turned on), and the first switching unit 132 and the third switching unit 136 are switched off (or turned off). The reason for this is to make the level of voltage output from the DC level converter 120A or 120B and the level of voltage corresponding to the auxiliary power stored in the power storage unit 144 equal to each other, as described above. In the instant case, as shown in FIG. 3 and FIG. 4, a path through which current flows in the direction indicated by the arrow AR2 is formed.

Thereafter, when the level of voltage output from the DC level converter 120A or 120B and the level of voltage corresponding to the auxiliary power stored in the power storage unit 144 become equal to each other, as shown in Table 2, the second stage is performed so that the second and fourth switching units 134 and 138 are maintained in a switched-on state, the third switching unit 136 is maintained in a switched-off state, and the first switching unit 132 is switched on (or turned on).

Thereafter, the third stage is performed so that the first and second switching units 132 and 134 are maintained in a switched-on state, the third switching unit 136 is maintained in a switched-off state, and the fourth switching unit 138 is switched off (or turned off). Accordingly, as shown in FIG. 3 and FIG. 4, a path through which current flows in the direction indicated by the arrow AR3 is formed, whereby the main power may be supplied to the load terminal 142.

That is, in the precharge mode, the fourth switching unit 138 is switched on (or turned on) to prevent overcurrent using the resistor R. Thereafter, when current flows in the direction indicated by the arrow AR2 shown in FIG. 3 and FIG. 4 and thus the level of voltage output from the DC level converter 120A or 120B and the level of voltage corresponding to the auxiliary power become equal to each other, the first switching unit 132 is switched on (or turned on), and the fourth switching unit 138 is switched off (or turned off).

As described above, according to the exemplary embodiment of the present disclosure, it may be seen that the resistor R is used as a discharge resistor in the discharge mode and is used as a precharge resistor in the precharge mode.

Furthermore, at least one of the performance time of the above-described operation modes or the heat generation temperature of the resistor R may vary depending on the resistance value of the resistor R. Therefore, the resistance value of the resistor R may be determined according to at least one of the performance time of the operation mode or the heat generation temperature of the resistor R.

Furthermore, the resistor R may be implemented as a variable resistor, and the resistance value of the variable resistor may vary to satisfy at least one of the performance time of the operation modes or the heat generation temperature of the resistor R according to the state of the fuel cell vehicle 100A or 100B.

FIG. 5 is a circuit diagram of a fuel cell vehicle 100C according to various exemplary embodiments of the present disclosure, in which the dotted line is a line connected to a negative (−) terminal and the solid line is a line connected to a positive (+) terminal.

The fuel cell vehicle 100C shown in FIG. 5 may include a cell stack, a DC level converter 120C, first, second, third, fourth, fifth and sixth relay elements 172, 174, 176, 178, 180, and 182, and various fuses F1, F2, F3, F4, F51, and F52.

Although illustration of the cell stack 110 is omitted from FIG. 5, the DC level converter 120C shown in FIG. 5 may be connected to each of the output terminal P1 of the positive-electrode side of the cell stack 110 and the output terminal N1 of the negative-electrode side of the cell stack 110 shown in FIG. 2. That is, although not shown in FIG. 5, the cell stack in the exemplary embodiment of the present disclosure may be the cell stack 110 shown in FIG. 2.

The DC level converter 120C may have the same configuration as the DC level converter 120B shown in FIG. 2, or may have a different configuration from the DC level converter 120B shown in FIG. 2. The exemplary embodiments are not limited to any predetermined configuration of the DC level converter 120C.

The fuel cell vehicle 100C shown in FIG. 5 is configured so that the resistor R, which is configured as a discharge resistor and a precharge resistor, is not included in the DC level converter 120C, as shown in FIG. 2.

The first to fourth relay elements 172, 174, 176, and 178 respectively perform the same functions as the first, second, third and fourth switching units 132, 134, 136, and 138 shown in FIG. 2.

That is, the first relay element 172 is disposed between the positive output terminal P4 of the DC level converter 120C and the positive input terminal of a main output ND1 to be connected thereto, and the second relay element 174 is disposed between the negative output terminal N4 of the DC level converter 120C and the negative input terminal of the main output ND1 to be connected thereto. Here, the main output ND1 may correspond to the output unit 140 shown in FIG. 2, or may correspond to the high-voltage battery, the inverter, or the motor.

The third relay element 176 is disposed between the negative output terminal N4 of the DC level converter 120C and a discharge resistor ND4 to be connected thereto, and the fourth relay element 178 is disposed between a contact point CP between the third relay element 176 and the resistor ND4 and the first relay element 172 to be connected thereto. Here, the resistor ND4 corresponds to the resistor R shown in FIG. 2.

Furthermore, the positive output terminal P4 and the negative output terminal N4 of the DC level converter 120C may be respectively connected to an air compressor ND2 and a stack cooling pump ND3.

The air compressor ND2 is configured to compress air necessary for generating stack voltage in the cell stack, assisting in generation of power in the cell stack or driving of the fuel cell vehicle 100C.

The stack cooling pump ND3 is configured to cool the fuel cell. For example, the stack cooling pump ND3 may pump coolant for cooling the fuel cell, and may supply the same to the fuel cell.

Furthermore, the fifth relay element 180 may be disposed between the output terminal P1 of the positive-electrode side of the cell stack and a positive input terminal of an end cell heater (or a cell heater) ND5 to be connected thereto, and the sixth relay element 182 may be disposed between the output terminal N1 of the negative-electrode side of the cell stack and a negative input terminal of the end cell heater ND5 to be connected thereto.

The end cell heater ND5 is configured to heat the cell stack. To the present end, the end cell heater ND5 may heat a plurality of unit cells through an end plate of the cell stack.

Furthermore, the fuses F1, F2, F3, F4, F51, and F52 may be disposed in respective lines through which power is supplied to the main output ND1, the air compressor ND2, the stack cooling pump ND3, the resistor ND4, and the end cell heater ND5, protecting the main output ND1, the air compressor ND2, the stack cooling pump ND3, the resistor ND4, and the end cell heater ND5 from excessive supply of power.

The fuel cell vehicle 100C shown in FIG. 5, which has the above-described configuration, operates in the same manner as the fuel cell vehicle 100B shown in FIG. 2, and thus will be described below in brief, and a duplicate description thereof will be omitted.

First, in the discharge mode, only the third relay element 176 is turned on, and the other relay elements 172, 174, 178, 180, and 182 are turned off. Accordingly, energy accumulated in the cell stack and the DC level converter 120C may be discharged through the resistor ND4.

Furthermore, in the precharge mode, the first and third relay elements 172 and 176 are turned off, and the second relay element 174 and the fourth relay element 178 are turned on. Thereafter, when the level of voltage corresponding to the main power supplied from the cell stack through the DC level converter 120C and the level of voltage corresponding to the auxiliary power stored in the high-voltage battery ND1 become equal to each other, the first relay element 172 is turned on, and then the fourth relay element 178 is turned off. Accordingly, at least one of the main power or the auxiliary power may be supplied to the main output ND1.

Hereinafter, a fuel cell vehicle according to a comparative example and the fuel cell vehicle according to the exemplary embodiment of the present disclosure will be described with reference to the accompanying drawings.

Figure 6:
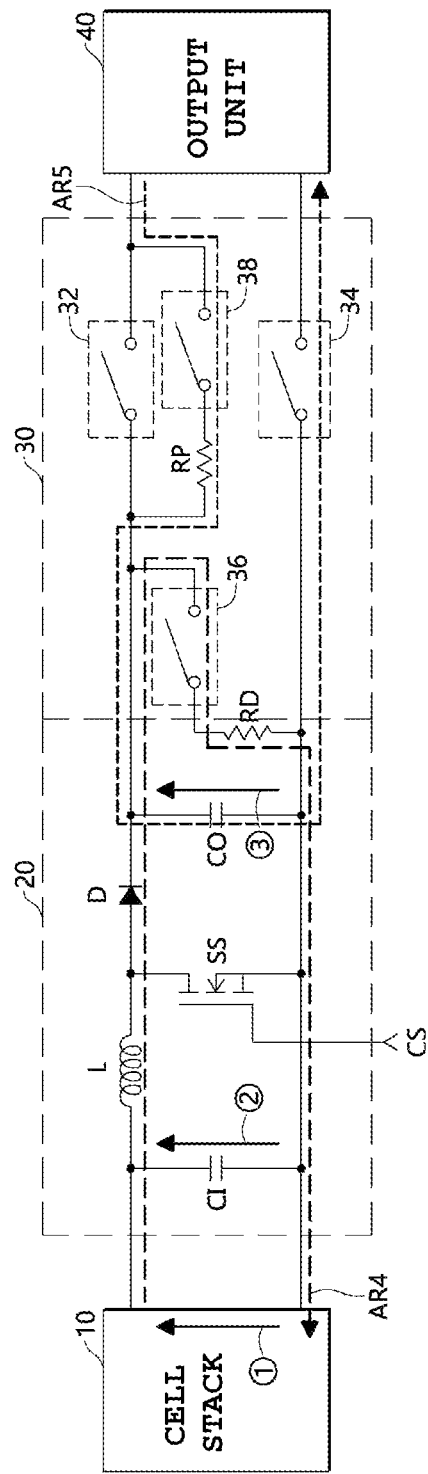
FIG. 6 is a block diagram of a fuel cell vehicle according to a comparative example.

FIG. 6 is a block diagram of a fuel cell vehicle according to a comparative example.

The fuel cell vehicle according to the comparative example shown in FIG. 6 may include a cell stack 10, a DC level converter 20, a junction box 30, and an output unit 40. The cell stack 10, the DC level converter 20, the junction box 30, and the output unit 40 may respectively perform the same functions as the cell stack 110, the DC level converter 120A, 120B, or 120C, the junction box 130A or 130B, and the output unit 140 according to the embodiment.

The DC level converter 20 shown in FIG. 6 may include an input capacitor CI, an inductor L, a diode D, an output capacitor CO, a semiconductor switch SS, and a discharge resistor RD. The input capacitor CI, the inductor L, the diode D, the output capacitor CO, and the semiconductor switch SS shown in FIG. 6 are the same as the input capacitor CI, the inductor L, the diode D, the output capacitor CO, and the semiconductor switch SS shown in FIG. 1 and FIG. 2, respectively, and thus the same reference numerals are assigned to the same components, and a duplicate description thereof will be omitted.

Unlike the fuel cell vehicle 100B according to the exemplary embodiment shown in FIGS. 2 and 4, the DC level converter 20 of the fuel cell vehicle according to the comparative example further includes a discharge resistor RD. Furthermore, unlike the fuel cell vehicle 100A according to the exemplary embodiment shown in FIGS. 1 and 3, the junction box 30 of the fuel cell vehicle according to the comparative example further includes a precharge resistor RP.

A first switch 32 is disposed between a positive output terminal of the DC level converter 20 and a positive input terminal of the output unit 40 to be connected thereto, and a second switch 34 is disposed between a negative output terminal of the DC level converter 20 and a negative input terminal of the output unit 40 to be connected thereto. A third switch 36 is disposed between the discharge resistor RD and the first switch 32 to be connected thereto, and the precharge resistor RP and the fourth switch 38 are connected in parallel to the first switch 32.

The fuel cell vehicle according to the comparative example may also perform a discharge mode and a precharge mode.

The operation of the fuel cell vehicle according to the comparative example including the above-described configuration will be described below.

First, to perform the discharge mode, the first, second, and fourth switches 32, 34, and 38 are turned off, and the third switch 36 is turned on. Accordingly, a path through which current flows in the direction indicated by the arrow AR4 is formed, whereby energy remaining in the cell stack 10 may be discharged in the direction indicated by the arrow ①, energy charged in the input capacitor CI may be discharged in the direction indicated by the arrow ②, and energy charged in the output capacitor CO may be discharged in the direction indicated by the arrow ③.

Next, to perform the precharge mode, the second and fourth switches 34 and 38 are turned on, and the first and third switches 32 and 36 are turned off. Accordingly, a path through which current flows in the direction indicated by the arrow AR5 is formed. Thereafter, when the level of voltage corresponding to main power and the level of voltage corresponding to auxiliary power become equal to each other, the first switch 32 is turned on, and then the fourth switch 38 is turned off. Accordingly, at least one of the main power or the auxiliary power may be supplied to the output unit 40.

As described above, in the case of the comparative example, the discharge resistor RD and the precharge resistor RP are provided separately from each other. In contrast, in the case of the exemplary embodiment of the present disclosure, a single resistor R is configured not only as the discharge resistor RD of the comparative example but also as the precharge resistor RP of the comparative example. Accordingly, the number of resistors is reduced compared to the comparative example, and thus the cost of manufacturing the fuel cell vehicles 100A, 100B, and 100C according to the embodiments, the sizes thereof, and the weights thereof may be reduced.

The resistance value of the discharge resistor RD and the resistance value of the precharge resistor RP according to the comparative example may be similar to each other. For example, the resistance value of each of the discharge resistor RD and the precharge resistor RP may be about 100 to 200Ω. Therefore, the resistor R according to the exemplary embodiment of the present disclosure may have a resistance value of about 100 to 200Ω, but the exemplary embodiments are not limited to any specific resistance value of the resistor R.

When the discharge mode and the precharge mode are performed, energy necessary for the discharge mode may be about ten times higher than energy necessary for the precharge mode. The reason for this is that the amount of remaining energy which is to be discharged from the cell stack 110 is large. Accordingly, the resistance value of the discharge resistor RD may be greater than the resistance value of the precharge resistor RP. In the case in which the resistor R of each of the fuel cell vehicles 100A, 100B, and 100C according to the exemplary embodiments is implemented to have the resistance value of the discharge resistor RD, the durability of the fuel cell vehicles 100A, 100B, and 100C is not deteriorated when the resistor R performs the function of the precharge resistor RP.

Furthermore, in the case of the exemplary embodiment of the present disclosure, the resistor R may be implemented as a variable resistor. In the instant case, the resistance value of the resistor R, which is a variable resistor, may be reduced to shorten a time required for performing the discharge mode (hereinafter referred to as a "discharge time") and a time required for performing the precharge mode (hereinafter referred to as a "precharge time"). Alternatively, if the temperature of the coolant is high or the temperature of the resistor R is high, the resistance value of the resistor R, which is a variable resistor, may be increased to decrease resistance loss per unit time, lowering the temperature of the resistor R.

However, when the resistance value of the resistor R is reduced, the amount of loss of the resistor R may increase for a provided time period, and thus the temperature of the resistor R may rise. Furthermore, when the resistance value of the resistor R is increased, the discharge time or the precharge time may increase. Therefore, in the exemplary embodiment of the present disclosure, the resistor R is implemented as a variable resistor so that the resistance value of the resistor R varies according to the state of each of the fuel cell vehicles 100A, 100B, and 100C, reducing the discharge time or the precharge time or lowering the temperature of the resistor R.

Furthermore, as shown in FIG. 2, when the resistor R is included in the junction box 130B, a separate water-cooling-type or air-cooling-type cooling unit for cooling the resistor R may be required. However, as shown in FIG. 1, when the resistor R is disposed in the DC level converter 120A, only the switching units 132 to 138 are present in the junction box 130A, and thus it is not necessary to dispose a separate cooling unit in the junction box 130A, reducing the manufacturing cost, the size, and the weight of the fuel cell vehicle. Even when a cooling unit is provided in the junction box 130A, the components to be cooled by the cooling unit are only the switching units 132 to 138, and thus the cooling unit may be implemented as an air-cooling-type cooling unit, which has a simpler configuration than a water-cooling-type cooling unit, reducing the manufacturing cost, the size, and the weight of the fuel cell vehicle.

Furthermore, because the DC level converter 120A includes elements that generate a large amount of heat, such as the semiconductor element SS and the inductor L, the first cooling unit 122, which is of a water-cooling type, rather than an air-cooling type, is disposed in the DC level converter 120A. Therefore, it is possible to cool the resistor R in a water-cooling manner using the first cooling unit 122 without the necessity to dispose a separate cooling unit for cooling the resistor R in the DC level converter 120A. Furthermore, because the temperature of the resistor R may be lowered in a water-cooling manner, the size (or the volume) of the resistor R may be reduced based thereon. Described in detail, in the exemplary embodiment of the present disclosure, the resistor R is used to consume energy. Therefore, heat is generated in the resistor R, and thus a maximum temperature threshold is set for the resistor R to withstand the heat generation temperature. If the heat generation temperature exceeds the maximum temperature threshold, the resistor R is damaged. Therefore, to prevent this, it is necessary to use a resistor including a large volume and a threshold temperature higher than the heat generation temperature. In consideration thereof, according to the exemplary embodiment of the present disclosure, because the heat generation temperature of the resistor R is lowered in a water-cooling manner, it is not necessary to use a resistor R including a high threshold temperature. Therefore, the volume of the resistor R may be reduced.

The resistor R is a passive element, which may malfunction due to sudden generation of overcurrent. Furthermore, because the DC level converter 120A, 120B, or 120C may be applied to the fuel cell vehicle 100A, 100B, or 100C only when the same satisfies environmental criteria specified therefor, the cover of the DC level converter 120A, 120B, or 120C is sealed. For the present reason, when elements embedded in the DC level converter 120A, 120B, or 120C malfunction, it is difficult to open or close the DC level converter 120A, 120B, or 120C for repair/maintenance thereof, and thus the entirety of the DC level converter 120A, 120B, or 120C, which is expensive, needs to be replaced. In contrast, because the junction box 130A or 130B includes replaceable internal elements, such as the relay element and the fuse, the cover of the junction box 130A or 130B is configured to be removable so that the internal components may be easily replaced in the event of malfunction thereof. That is, it is possible to open or close the junction box 130A or 130B for repair/maintenance thereof.

In consideration thereof, when the resistor R is disposed in the DC level converter 120A, as shown in FIG. 1, it may be difficult to replace the resistor R, or it may be necessary to replace the entirety of the DC level converter 120A. In contrast, when the resistor R is disposed in the junction box 130B, as shown in FIG. 2, it is possible to easily replace the resistor R, facilitating repair/maintenance thereof.

To the present end, according to the exemplary embodiment of the present disclosure, as shown in FIG. 2, when the resistor R is disposed in the junction box 130B, the resistor R may be detachably disposed in the junction box 130B.

As is apparent from the above description, in the fuel cell vehicle according to the exemplary embodiment of the present disclosure, a single resistor serves not only as a discharge resistor but also as a precharge resistor, and thus it is possible to reduce the cost of manufacturing the fuel cell vehicle, the size thereof, and the weight thereof. Furthermore, the resistor is implemented as a variable resistor so that the resistance value of the resistor varies according to the state of the fuel cell vehicle, reducing a discharge time or a precharge time or lowering the temperature of the resistor. When the resistor is disposed in the DC level converter, it is not necessary to dispose a separate cooling unit in the junction box. Even if a cooling unit is provided in the junction box, the cooling unit may be implemented as an air-cooling-type cooling unit, which has a simpler configuration than a water-cooling-type cooling unit, reducing the manufacturing cost, the size, and the weight of the fuel cell vehicle. Furthermore, it is possible to cool the resistor in a water-cooling manner using the first cooling unit without the necessity to dispose a separate cooling unit for cooling the resistor in the DC level converter. Furthermore, when the resistor is disposed in the junction box, it is possible to easily replace the resistor, facilitating repair/maintenance thereof.

However, the effects achievable through the present disclosure are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

Furthermore, for any element or process which is not described in detail in any of the various exemplary embodiments of the present disclosure, reference may be made to the description of an element or a process including the same reference numeral in another exemplary embodiment of the present disclosure, unless otherwise specified.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A fuel cell vehicle, comprising:
a cell stack including a plurality of unit cells stacked one above another;
a DC level converter connected to the cell stack and configured to convert a level of stack voltage output from the cell stack and to output voltage having the converted level;
an output unit configured to be driven in response to at least one of main power or auxiliary power and to store the auxiliary power;
a first switching unit disposed between a positive output terminal of the DC level converter and a positive input terminal of the output unit to be selectively connected thereto;
a second switching unit disposed between a negative output terminal of the DC level converter and a negative input terminal of the output unit to be selectively connected thereto;
a resistor and a third switching unit connected to each other in series between the positive output terminal of the DC level converter and the negative output terminal of the DC level converter;
a fourth switching unit disposed between a contact point between the resistor and the third switching unit and the positive input terminal of the output unit to be selectively connected thereto; and
a controller configured to control switching operation of the first, second, third, and fourth switching units according to an operation mode.

2. The fuel cell vehicle of claim 1, wherein the operation mode includes a plurality of modes operating at different time points.

3. The fuel cell vehicle of claim 2, wherein the plurality of modes includes:
a discharge mode discharging energy remaining in each of the cell stack and the DC level converter; and
a precharge mode operating before the main power is supplied to the output unit.

4. The fuel cell vehicle of claim 1, wherein the resistor includes a variable resistor.

5. The fuel cell vehicle of claim 4, wherein a resistance value of the variable resistor is determined according to at least one of a performance time of the operation mode or a heat generation temperature of the resistor.

6. The fuel cell vehicle of claim 1, wherein the resistor has a resistance value of 100Ω to 200Ω.

7. The fuel cell vehicle of claim 1, wherein the DC level converter includes:
an input capacitor disposed between an output terminal of a positive-electrode side of the cell stack and an output terminal of a negative-electrode side of the cell stack;
an output capacitor disposed between the positive output terminal of the DC level converter and the negative output terminal of the DC level converter;
an inductor including one end connected to the output terminal of the positive-electrode side of the cell stack;
a diode including an anode connected to a remaining end of the inductor and a cathode connected to the positive output terminal of the DC level converter; and
a semiconductor switch disposed between the anode of the diode and the output terminal of the negative-electrode side of the cell stack to be connected thereto, the semiconductor switch being configured to be switched in response to a driving control signal of the controller.

8. The fuel cell vehicle of claim 7,
wherein the resistor has one end connected to the cathode of the diode, and
wherein the third switching unit is disposed between a remaining end of the resistor and the negative output terminal of the DC level converter to be selectively connected thereto.

9. The fuel cell vehicle of claim 1, wherein the resistor is disposed in the DC level converter.

10. The fuel cell vehicle of claim 9, wherein the DC level converter includes a first cooling unit configured to cool the resistor in a water-cooling manner.

11. The fuel cell vehicle of claim 1, further comprising:
a junction box disposed between the DC level converter and the output unit to distribute power generated in the cell stack,
wherein the first, second, third, and fourth switching units are disposed in the junction box.

12. The fuel cell vehicle of claim 11, wherein the junction box includes a second cooling unit configured to cool the first, second, third, and fourth switching units in an air-cooling manner.

13. The fuel cell vehicle of claim 11, wherein the resistor is disposed in the junction box.

14. The fuel cell vehicle of claim 13, wherein the resistor is detachably disposed in the junction box.

15. The fuel cell vehicle of claim 1, wherein the output unit includes:
a load terminal configured to be driven in response to at least one of the main power or the auxiliary power supplied through the positive input terminal and the negative input terminal; and
a power storage unit configured to supply the stored auxiliary power to the load terminal through the positive input terminal and the negative input terminal.

16. The fuel cell vehicle of claim 15, wherein the power storage unit includes a high-voltage battery configured to supply the stored auxiliary power to the load terminal through the positive input terminal and the negative input terminal.

17. The fuel cell vehicle of claim 15, wherein the power storage unit includes a supercapacitor configured to supply the stored auxiliary power to the load terminal through the positive input terminal and the negative input terminal.

18. A fuel cell vehicle, comprising:
a cell stack including a plurality of unit cells stacked one above another;
an input capacitor disposed between an output terminal of a positive-electrode side of the cell stack and an output terminal of a negative-electrode side of the cell stack;
an inductor including one end connected to the output terminal of the positive-electrode side of the cell stack;
a diode including an anode connected to a remaining end of the inductor;
an output capacitor disposed between a cathode of the diode and the output terminal of the negative-electrode side of the cell stack to be connected thereto;
a semiconductor switch disposed between the anode of the diode and the output terminal of the negative-electrode side of the cell stack to be connected thereto, the semiconductor switch being configured to be switched in response to a driving control signal;
a power storage unit configured to store auxiliary power;
a load terminal configured to be driven in response to at least one of main power applied across first and second ends of the output capacitor or the auxiliary power stored in the power storage unit;

a first switching unit disposed between a positive input terminal of each of the load terminal and the power storage unit and the cathode of the diode to be selectively connected thereto;

a second switching unit disposed between a negative input terminal of each of the load terminal and the power storage unit and the output terminal of the negative-electrode side of the cell stack to be selectively connected thereto;

a resistor including one end connected to the cathode of the diode;

a third switching unit disposed between a remaining end of the resistor and the output terminal of the negative-electrode side of the cell stack to be selectively connected thereto;

a fourth switching unit disposed between the positive input terminal of each of the load terminal and the power storage unit and the remaining end of the resistor to be selectively connected thereto; and a controller configured to control switching operation of the first, second, third and fourth switching units according to an operation mode.

19. The fuel cell vehicle of claim 18, further comprising:

a DC level converter connected to the cell stack and configured to convert a level of stack voltage output from the cell stack and to output voltage including the converted level; and a junction box disposed between the DC level converter and each of the load terminal and the power storage unit, wherein the DC level converter includes the input capacitor, the output capacitor, the semiconductor switch, the diode, the inductor, and the resistor, and wherein the junction box includes the first, second, third and fourth switching units.

20. The fuel cell vehicle of claim 18, further comprising:

a DC level converter connected to the cell stack and configured to convert a level of stack voltage output from the cell stack and to output voltage including the converted level; and a junction box disposed between the DC level converter and each of the load terminal and the power storage unit, wherein the DC level converter includes the input capacitor, the output capacitor, the semiconductor switch, the diode, and the inductor, and wherein the junction box includes the first, second, third, and fourth switching units and the resistor.

* * * * *